US008848625B2

(12) United States Patent
Kalyanasundaram et al.

(10) Patent No.: US 8,848,625 B2
(45) Date of Patent: Sep. 30, 2014

(54) METHOD, SERVER AND SYSTEM FOR PROPAGATING A WIRELESS COMMUNICATION DEVICE STATE

(75) Inventors: Sanjay Kalyanasundaram, Kitchener (CA); Allan David Lewis, New Dundee (CA); Santiago Cabonell Duque, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 557 days.

(21) Appl. No.: 12/897,822

(22) Filed: Oct. 5, 2010

(65) Prior Publication Data

US 2012/0084344 A1 Apr. 5, 2012

(51) Int. Cl.
| | |
|---|---|
| *H04W 4/00* | (2009.01) |
| *H04W 8/22* | (2009.01) |
| *H04W 92/24* | (2009.01) |
| *H04W 72/00* | (2009.01) |
| *H04W 28/06* | (2009.01) |
| *H04W 8/24* | (2009.01) |

(52) U.S. Cl.
CPC ............... *H04W 8/22* (2013.01); *H04W 72/00* (2013.01); *H04W 28/06* (2013.01); *H04W 8/24* (2013.01); *H04W 92/24* (2013.01)
USPC ........... 370/329; 709/201; 709/203; 709/217; 709/229; 370/338

(58) Field of Classification Search
CPC .................................................. H04W 72/048
USPC ................................... 709/203, 229; 370/329
See application file for complete search history.

(56) References Cited

U.S. PATENT DOCUMENTS

| | | | |
|---|---|---|---|
| 6,745,193 B1 | 6/2004 | Horvitz et al. | |
| 6,832,259 B2 * | 12/2004 | Hymel et al. | ............... 709/229 |
| 2003/0186722 A1 | 10/2003 | Weiner | |
| 2005/0198199 A1 * | 9/2005 | Dowling | ..................... 709/217 |
| 2006/0179115 A1 | 8/2006 | Garcia-Martin et al. | |
| 2008/0186929 A1 * | 8/2008 | Rice et al. | .................... 370/338 |
| 2009/0327390 A1 * | 12/2009 | Tran et al. | .................... 709/201 |

FOREIGN PATENT DOCUMENTS

| | | |
|---|---|---|
| EP | 1 021 021 A2 | 7/2000 |
| EP | 2 009 873 A1 | 12/2008 |

OTHER PUBLICATIONS

Corresponding European Patent application No. 10186588.9 European Search Report mailed dated Apr. 6, 2011.

* cited by examiner

*Primary Examiner* — Glenford Madamba
(74) *Attorney, Agent, or Firm* — Perry + Currier, Inc.

(57) ABSTRACT

A method server and system for propagating a mobile communication device state are provided. State data defining a state of a mobile communication device is received from the mobile communication device at a server in communication with the mobile communication device. The state data is incorporated into wireless network data transmitted from the mobile communication device. The state data is stored in a resource indicator storing at the server. A request for the state data is received from a second server. At least a subset of the state data is transmitted to the second server, such that the second server can determine whether the mobile communication device is in a state to handle incoming data.

18 Claims, 3 Drawing Sheets

METHOD, SERVER AND SYSTEM FOR PROPAGATING A WIRELESS COMMUNICATION DEVICE STATE

FIELD

The specification relates generally to wireless communication devices, and specifically to a method, server and system for propagating the state of a wireless communication device.

BACKGROUND

Optimization of wireless link usage can be challenging and complex, and is associated with the technical problems of bandwidth optimization and integration of third party application servers with carrier networks, in order to push data to wireless communication devices.

BRIEF DESCRIPTIONS OF THE DRAWINGS

Embodiments are described with reference to the following Figures, in which.

DETAILED DESCRIPTION OF THE EMBODIMENTS

New mobile business models are exerting downward price pressure on operational expenditure especially for services in mobile networks that are free or supported by advertising revenue. While mobile network usage has become cheaper, wireless links are still a premium and applications that use the wireless link without optimization can become needlessly expensive. However, optimization of wireless link usage can be very complex and becomes more complex when application/content servers, external to a carrier network, perform the optimization. This is further complicated in situations where an application/content server pushes data to wireless communication devices, and the push is not requested by the application on a wireless communication device.

A first aspect of the specification provides a method of propagating a mobile communication device state. The method comprises receiving, from a mobile communication device at a server in communication with the mobile communication device, state data defining a state of the mobile communication device, the state data incorporated into wireless network data transmitted from the mobile communication device. The method further comprises storing, at the server, the state data in a resource indicator. The method further comprises receiving a request for the state data from a second server. The method further comprises transmitting at least a subset of the state data to the second server, such that the second server can determine whether the mobile communication device is in a state to handle incoming data.

The incoming data can be normally transmitted to the mobile communication device via a first link, and the state data can comprise data for determining whether the incoming data can be transmitted to the mobile communication device via a second link different from the first link. Transmission of data on the first link can be associated with a first billing rate that is greater than a second billing rate associated with transmission of data on the second link. The first link can comprise a wireless link.

The receiving the request step and the transmitting step can each occur via a server-to-server API (application programming interface) at the server.

The state data can comprise at least one of current power remaining on a battery at the mobile communication device, available memory at the mobile communication device, a roaming status, a coverage status, a signal strength for a wireless link between the mobile communication device and a network, a connectivity status between the mobile communication device and a network, or an on-off status.

The server can comprise a proxy server for storing state information of a plurality of mobile communication devices.

Communication between the server and the mobile communication device can occur via a data center.

The method can further comprise removing the at least a subset of the state data of data identifying a user associated with the mobile communications device such that the at least a subset is provided anonymously.

A second aspect of the specification provides a server configured to propagate a mobile communication device state. The server comprises a processing unit interconnected with a memory device and a communication interface. The processing unit is enabled to: receive, from a mobile communication device, via the communication interface, state data defining a state of the mobile communication device, the state data incorporated into wireless network data transmitted from the mobile communication device; store, at the memory device, the state data in a resource indicator; receive, via the communication interface, a request for the state data from a second server; and transmit, via the communication interface, at least a subset of the state data to the second server, such that the second server can determine whether the mobile communication device is in a state to handle incoming data.

The incoming data can be normally transmitted to the mobile communication device via a first link, and the state data can comprises data for determining whether the incoming data can be transmitted to the mobile communication device via a second link different from the first link. Transmission of data on the first link can be associated with a first billing rate that is greater than a second billing rate associated with transmission of data on the second link. The first link can comprise a wireless link.

The receiving the request and the transmitting can each occur via a server-to-server API (application programming interface) at the server.

The state data can comprise at least one of current power remaining on a battery at the mobile communication device, available memory at the mobile communication device, a roaming status, a coverage status, a signal strength for a wireless link between the mobile communication device and a network, a connectivity status between the mobile communication device and a network, or an on-off status.

The server can further comprise a proxy server for storing state information of a plurality of mobile communication devices.

Communication between the server and the mobile communication device can occur via a data center.

The processing unit can be further enabled to remove the at least a subset of the state data of data identifying a user associated with the mobile communications device such that the at least a subset is provided anonymously.

A third aspect of the specification provides a system for propagating a mobile communication device state. The system comprises a mobile communication device enabled to transmit state data defining a state of the mobile communication device, the state data incorporated into wireless network data transmitted from the mobile communication device. The system further comprises a data center server in communication with the mobile communication device, the data center server enabled to extract the state data from the wireless network data and transmit the state data. The system further comprises a status server in communication with the data center server. The status server is enabled to: receive the state data from the data center server; store the state data in a resource indicator; receive a request for the state data; and transmit at least a subset of the state data. The system further comprises an application server in communication with the status server. The application server is enabled to: request the state data from the status server; receive at least a subset of the state data; and determine whether the mobile communication device is in a state to handle incoming data.

A fourth aspect of the specification provides a computer program product, comprising a computer usable medium having a computer readable program code adapted to be executed to implement a method for propagating a mobile communication device state, the method comprising: receiving, from a mobile communication device at a server in communication with the mobile communication device, state data defining a state of the mobile communication device, the state data incorporated into wireless network data transmitted from the mobile communication device; storing, at the server, the state data in a resource indicator; receiving a request for the state data from a second server; and transmitting at least a subset of the state data to the second server, such that the second server can determine whether the mobile communication device is in a state to handle incoming data. The computer usable medium can be non-transitory.

Figure 1:
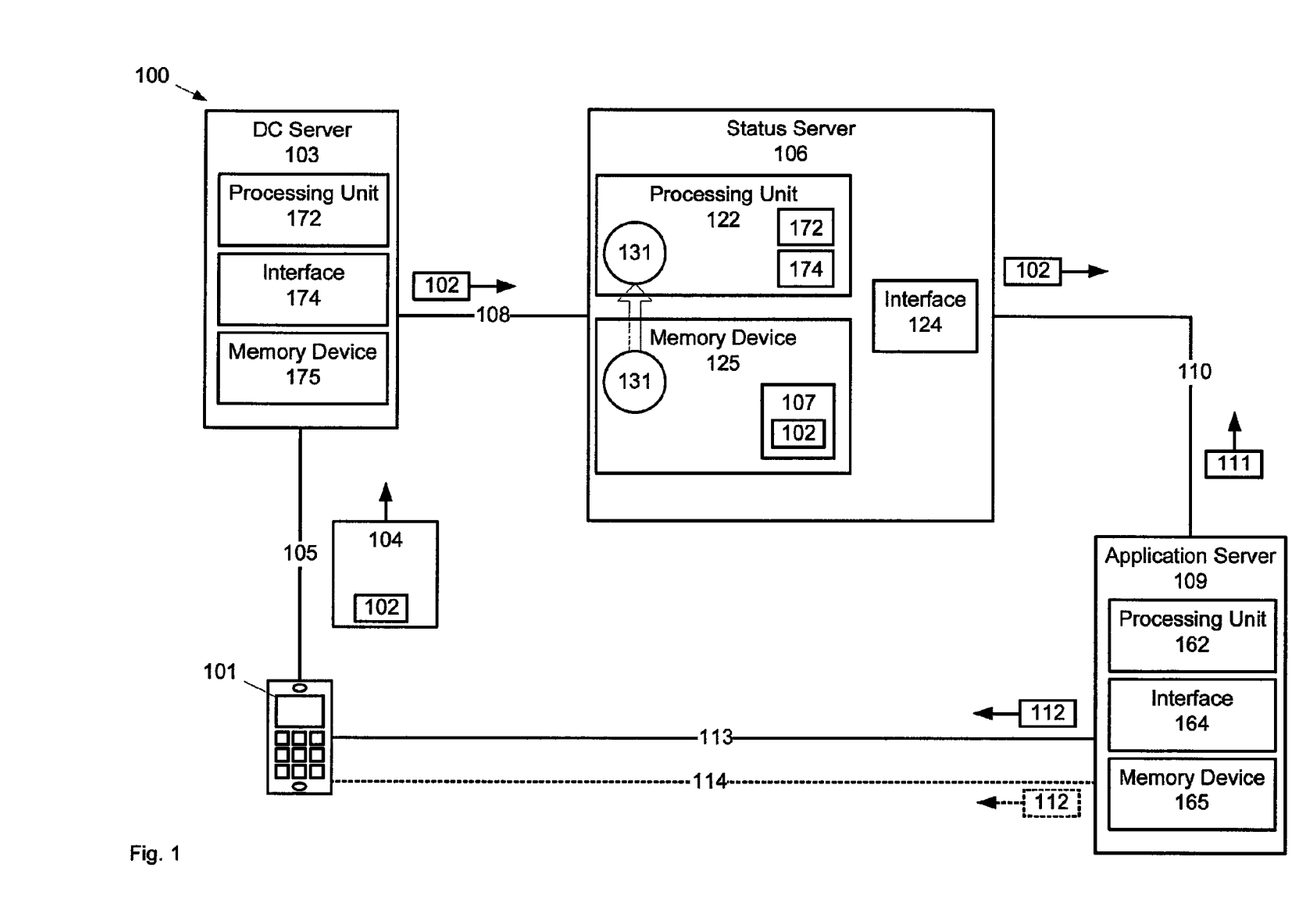
FIG. 1 depicts a block diagram of a system for propagating a mobile communication device state, according to non-limiting embodiments.

FIG. 1 depicts a system 100 for propagating state data 102 of a mobile communication device 101, according to non-limiting embodiments. In general, state data 102 defines a state of mobile communication device 101 which is communicated to a data center (DC) server 103, state data 102 incorporated into transmission of wireless network data 104 from mobile communication device 101 to DC server 103 via a link 105. At DC server 103, state data 102 is extracted from wireless network data 104 and transmitted to a status server 106 for storage in a resource indicator 107, via a link 108. An application server 109 (which can be hosted on a communication network such as the Internet or alternatively at computing devices associated with data center, see below) can then request state data 102 from status server 106, for example via a link 110 and a request 111. Status server 106 transmits state data 102 to applications server 109. In some embodiments, rather than transmit all of state data 102, server 106 transmits a subset of state data 102. As described below, state data 102 or a subset thereof, can be requested via an application programming interface (API) 131 at status server 106, API 131 controlling access to state data 102, generally acting as a broker between status server 106 and application server 109. Application server 109 is generally enabled to process state data 102 (or alternatively a subset of state data 102), state data 102 enabling application server 109 to determine whether mobile communication device 101 is in a state to handle incoming data. The application server 109 can then determine whether to transmit data 112 to mobile communication device 101 via a carrier network link 113. However, state data 102 can further enable application server 109 whether to transmit data 112 via a link 114 different from carrier network link 113. In some embodiments transmission of data on link 114 is cheaper than transmission of data on carrier network link 113. For example, link 114 can comprise the Internet and a WiFi connection to mobile communication device 101, while carrier network link 113 can comprise a cell-phone data link, which is generally associated with higher cost data rates than Internet/WiFi links. In some embodiments, carrier network link 113 is associated with a home carrier network associated with mobile computing device 101; in other embodiments, carrier network link 113 is associated with a roaming carrier network, for example when mobile computing device 101 has been transported to a region on serviced by the home carrier network.

Link 105 comprises a wireless link between mobile communication device 101 and DC server 103. Similarly, link 113 comprises a wireless link between mobile communication device 101 and application server 109. Each of links 105, 113 can comprise a wireless network, such as a wireless carrier network, including but not limited to any suitable cell phone network (1X, UTMS, CDMA, GMS, 3G, EDGE, and the like), in combination with any suitable combination of wired or wireless networks as desired, including but not limited to a packet based network, the Internet, an analog network, the PSTN, a WiFi network, a WiMax network and the like.

Link 114 can comprise any suitable combination of wired or wireless networks as desired, including but not limited to a packet based network, the Internet, an analog network, the PSTN (Public Switched Telephone Network), a WiFi network, a WiMax network and the like. In particular, link 114 is different from link 113 and hence can exclude a wireless carrier network in link 113.

Links 108, 110 can comprise any suitable combination of wired or wireless networks as desired, including but not limited to a packet based network, the Internet, an analog network, the PSTN, a WiFi network, a WiMax network and the like.

Mobile communication device 101 can comprise any suitable mobile communication device and/or computing device, including but not limited to a tablet, laptop or notebook computer, a PDA, a cellular or mobile phone, a portable electronic device, or the like. In particular non-limiting embodiments, mobile communication device 101 can comprise a netbook that connects to cloud services. As netbooks traditionally have less computing power and more sensitivity to battery usage, they leverage computing power of the cloud based infrastructure to off-load processing. Hence, in these embodiments, determining whether mobile communication device 101 is in a state to handle incoming data can be particularly desirable. However, other suitable types of mobile communication devices are within the scope of present embodiments. Mobile communication device 101 is described in more detail below with reference to FIG. 2

Status server 106 comprises a processing unit 122, a communications interface 124 and memory device 125 all in communication, for example, via a computing bus (not depicted). Status server 106 comprises any suitable computing device for propagating state data 102 via resource indicator 107. Status server 106 can include but is not limited to any suitable combination of a computer, a mainframe computer, a server and the like. Other suitable types of computing devices are within the scope of present embodiments.

Memory device 125 can be any suitable one of or combination of volatile memory, non-volatile memory, RAM (Random Access Memory), ROM (Read-Only Memory), hard drive, optical drive or the like. In particular, memory device 125 is enabled to store resource indicator 107.

Processing unit 122 can comprise any suitable processor, or combination of processors, including but not limited to a microprocessor, CPU (central processing unit), or the like.

Processing unit 122 can comprise a comparator 172 for comparing values including but not limited to alphanumeric values, and a calculator 174 for performing mathematical operations on numerical values and/or performing textual operations on text values.

Communications interface 124 is enabled to communicate with DC server 103 via link 108, and with application server 109 via link 110. Accordingly, communications interface 124 is enabled to communicate according to any suitable protocol which is compatible with links 108, 110 and/or a suitable communications network, including but not limited to packet based protocols, Internet protocols, analog protocols, cell phone protocols (1X, UTMS, CDMA, GMS, 3G, EDGE and the like), WiFi protocols, WiMax protocols and/or a combination of these. Other suitable protocols are within the scope of present embodiments.

Status server 106 can further comprise applications programming interface (API) 131 stored in memory device 125 and processable by processing unit 122, which enables status server 106 to communicate with application server 109 such that application server 109 can retrieve state data 102 via API 131. API 131 is generally enabled to broker transmission of state data 102, or a subset thereof, to application server 109. For example, application server 109 can request specific state data via request 111, and API 131 can evaluate request 111 and provide the requested state data 102 and/or provide a subset of the requested state data 102 based on an identifier of application server 109, permissions associated with application server 109 and the like.

It is understood that status server 106 can store state data similar to state data 102 for a plurality of mobile communication devices, similar to mobile communication device 101. In some embodiments, status server 106 comprises a proxy server for storing state information of the plurality of mobile communication devices. It is furthermore understood that state data for the plurality of mobile communication devices can be stored in resource indicator 107 or a plurality of resource indicators 107. It is understood that resource indicator 107 stores device status information and that data stored in resource indicator 107 is provided to application server 109 via API 131 acting as a broker as described above. In some embodiments, resource indicator 107 provides a partial snapshot of all possible device information that can be captured and stored, such that a minimum of information is transmitted over the air, for example data pertaining to determining whether mobile communication device 101 is in a state to handle incoming data.

In some embodiments, status server 106 can comprise a dedicated status server, while in other embodiments, status server 106 can further comprise another type of server, such as a presence server with publish/subscribe capabilities. In these embodiments, mobile communication device 101 can publish state data 102 to the presence server, via transmission of wireless network data 104 and application server 109 can subscribe to state data 102.

Application server 109 comprises a processing unit 162, a communication interface 164, and a memory device 165, all in communication, for example, via a computing bus (not depicted). Each of processing unit 162, communication interface 164, and memory device 165 can be respectively similar to processing unit 122, communication interface 124, and memory device 125 described above. It is understood that communication interface 164 is further enabled to communicate with mobile communication device 101 via link 113 via any suitable combination of wired and wireless protocols. It is generally understood that application server 109 can be associated with any suitable entity and/or network and/or carrier, including but not limited to an entity and/or network and/or carrier associated with DC server 103, and third party developers that generate data 112.

In particular, application server 109 is enabled to communicate with status server 106, for example via API 131 to request and receive state data 102 and determine a state of mobile communication device 101. In particular, application server 109 is enabled to determine when data 112 can be transmitted to mobile communication device 101 via link 114. In some embodiments, application server 109 is enabled to determine whether data 112 can be transmitted to application server 109 without first communicating with mobile communication device 101.

In some embodiments, application server 109 is enabled to transmit data 112 to mobile communication device 101 on a periodic basis, and/or when a predefined trigger occurs. In some embodiments, application server 109 can be enabled to push data 112 to mobile communication device 101, for example without first receiving a request for data 112 from mobile communication device 101. In these embodiments, data 112 can comprise data for an application to which mobile communication device 101 is subscribed, such as weather reports, sports scores, stock prices, and the like. Hence, application server 109 is generally enabled to manage data 112, interface with sources of data 112 via a communication network (not depicted), such as weather servers, sports servers, stock market servers and the like, and transmit data 112 to mobile communication device 101. In some embodiments, application server 109 can comprise an advertisement server for mobile use cases. For example, an advertisement server stores advertisement data and provides the advertisement data to devices such as mobile communication device 101. In other embodiments, application server 109 can comprise a content push server based on subscription. In further embodiments, application server 109 can comprise a media service for mobile device.

Transmission of data 112 can occur periodically, on a predetermined schedule, and/or when data 112 is received and/or generated at application server 109. For example, application server 109 can compile data from different sources to generate data 112 and/or receive data 112 from one or more sources, which can trigger transmission of data 112 to mobile communication device 101. In some embodiments, application server 112 can store an identifier of mobile communication device 101 in memory device 165 in association with identifiers of applications to which mobile communication device 101 is subscribed such that data 112 can be determined/generated and transmitted.

DC server 103 comprises a processing unit 172, a communication interface 174, and a memory device 175, all in communication, for example, via a computing bus (not depicted). Each of processing unit 172, communication interface 174, and memory device 175 can be respectively similar to processing unit 122, communication interface 124, and memory device 125 described above. It is understood that communication interface 174 is further enabled to communicate with mobile communication device 101 via link 105 via any suitable combination of wired and wireless protocols. DC server 103 is enabled to monitor the operation of mobile communication device 101 by receiving communications, such as wireless network data 104, from mobile communication device 101 on a periodic basis, and/or on demand and/or when changes occur at mobile communication device 101. For example, it is understood that embodiments where mobile communication device 101 comprises a cell phone, mobile communication device 101 can change cells from within which it is communicating with the wireless carrier network.

In these embodiments, wireless network data 104 can comprise a handoff communication and/or a communication advising DC server 103 that mobile communication device 101 is changing or has changed cells.

However it is understood that wireless network data 104 can include any suitable combination of handoff data, ping data, keep alive data, application control data (e.g. metadata for e-mail, instant messaging etc.) and/or any other suitable data transmitted from mobile communication device 101 to DC server 103.

DC server 103 is generally enabled to manage communication of mobile network device 101 with a carrier network, such that incoming calls and/or data can be routed to mobile communication device 101. DC server 103 accomplishes such management via wireless network data 104.

In some embodiments, the functionality of status server 106 can be combined with DC server 103, using the resources of DC server 103. In these embodiments, DC server 103 comprises resource indicator 107 and API 131.

Figure 2:
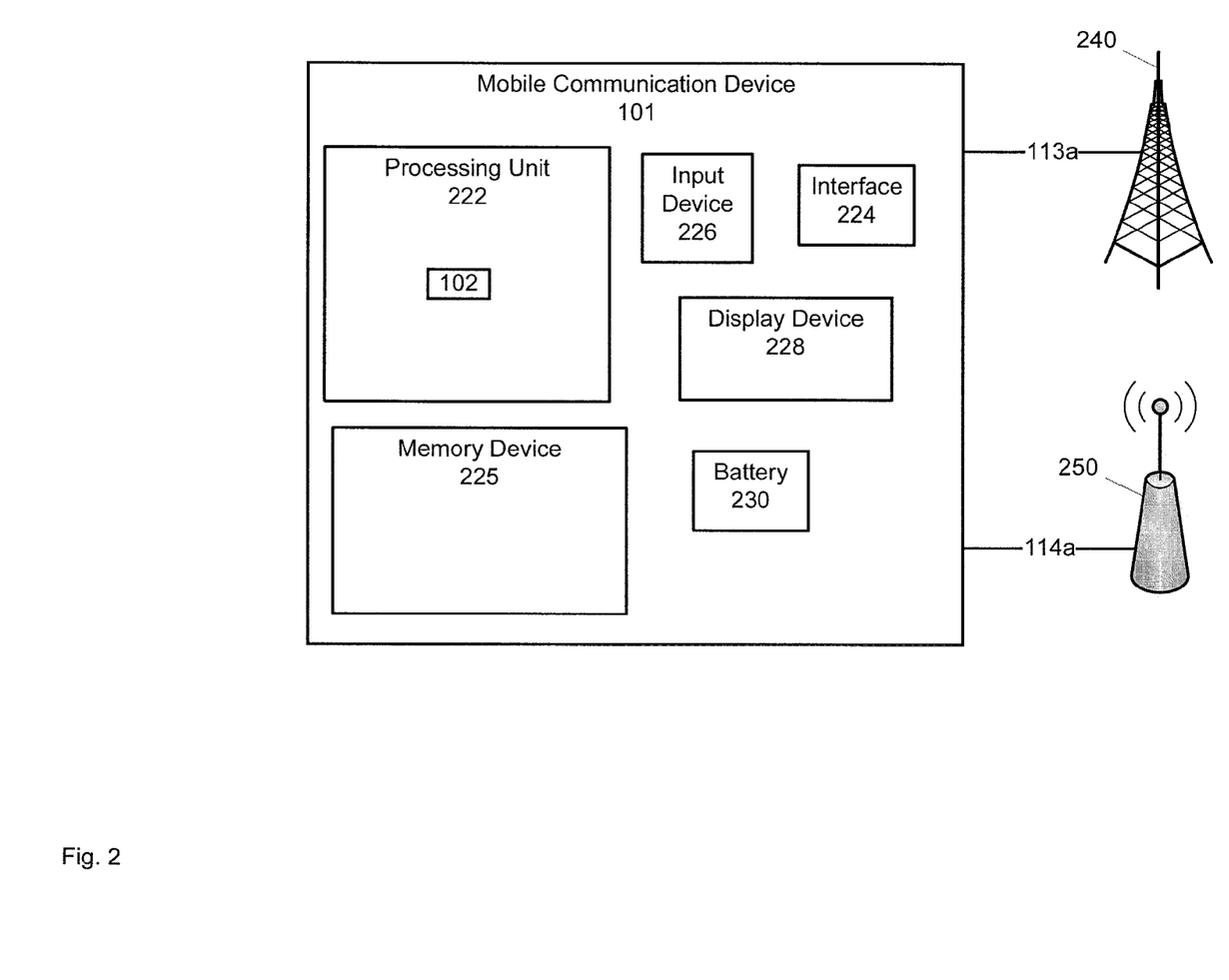
FIG. 2 depicts a block diagram of a mobile communication device, according to non-limiting embodiments; and, FIG. 3 depicts a flow chart of a method for propagating a mobile communication device state, according to non-limiting embodiments.

Attention is now directed to FIG. 2, which depicts mobile communication device 101, according to non-limiting embodiments. Mobile communication device 101 comprises a processing unit 222, a communication interface 224, and a memory device 225, an input device 226 and a display device 228, all in communication, for example, via a computing bus (not depicted), and powered by batter 230. Each of processing unit 222, communication interface 224, and memory device 225 can be respectively similar to processing unit 122, communication interface 124, and memory device 125 described above. It is understood that communication interface 224 is enabled to communicate with: DC server 103 via link 113 via any suitable wireless protocol; and with application server 109 via link 113, 114 via any suitable wireless protocol.

In particular, in some embodiments, it is understood that communication interface 224 is enabled to communicate with application server 109 via a carrier network tower 240, with a wireless link 113a between mobile communication device 101 and carrier network tower 240 being a first of several communication links that comprise link 113. Hence, it is understood that from carrier network tower 240, link 113 is completed using any suitable combination of wired and/or wireless networks. In some embodiments, carrier network tower 240 comprises any suitable cell-phone tower. In some embodiments, carrier network tower 240 is associated with a carrier network.

Similarly, in some embodiments, it is understood that communication interface 224 is enabled to communicate with application server 109 via an alternate wireless network apparatus 250, with a wireless link 114a between mobile communication device 101 and alternate wireless network apparatus 250 being a first of several communication links that comprise link 114. Hence, it is understood that from alternate wireless network apparatus 250, link 114 is completed using any suitable combination of wired and/or wireless networks. In some embodiments, alternate wireless network apparatus 250 comprises any suitable WiFi router and/or WiMax router.

Mobile communication device 101 is further enabled to generate state data 102. For example, processing unit 222 can monitor the state of mobile computing device 101 including but not limited to at least one of: power available from battery 230; available memory in memory device 225; a roaming status (e.g. whether mobile communication device 101 is connected to a home carrier network or a roaming carrier network, and/or an identifier of the carrier network), a coverage status (e.g. in-coverage or out of coverage, and hence representative of reachability), a signal strength for link 113 and/or link 113a and/or link 114 and/or link 114a, a connectivity status between mobile communication device 101 and at least one of the carrier network and a network other than the carrier network, and an on-off status.

In an example non-limiting embodiment, state data 102 can comprise the contents of Table 1:

TABLE 1

| | | |
|---|---|---|
| 1 | Date | Wednesday, Sep. 16, 2009 |
| 2 | Time | 09:15 |
| 3 | On/Off | On |
| 4 | Battery | 85% |
| 5 | Memory | 18 MB available |
| 6 | Home Carrier Network | Cross Border Telephone Company |
| 7 | Roaming | Yes |
| 8 | Roaming Carrier Network | Away Telephone Company |
| 9 | Connectivity Status | Connected |
| 10 | Signal Strength | −70 dB |
| 11 | Coverage | 1 |
| 12 | WiFi SSID | Smith_Residence |
| 13 | WiFi Connectivity Status | Connected |
| 14 | Signal Strength | 10 dB |

Though Table 1 is presented in cells arranged in rows and columns, it is understood that state data 102, and/or any subset thereof, can be stored in any suitable format. In any event, Table 1 comprises fourteen rows divided into columns, each row associated with a subset of status data the first column in each row identifying the status data associated with the row, and the second column comprising the state data subset. A first row can identify the date ("Wednesday, Sep. 16, 2009") and a second row can identify the time ("09:15", e.g. in 24 hour format, or any other suitable format). A third row can comprise the on/off state of mobile communication device 101 ("On"), a fourth row can comprise the percentage power left in batte 230 ("85%"), and a fifth row can comprise memory available to third party applications in memory device 225 ("18 MB"). A sixth row can identify the home carrier network ("Cross Border Telephone Company"). A seventh row can identify whether or not mobile communication device 101 is roaming ("Yes"); when mobile communication device 101 is roaming, an eight row can identify the roaming carrier network ("Away Telephone Company"). However, when mobile communication device 101 is not roaming, the second column of the eighth row can be blank. A ninth row can comprise an indication of whether or not mobile communication device 101 is connected to a carrier network, a tenth row can comprise the signal strength of link 113a, and an eleventh row can comprise the coverage of the carrier network (e.g. "1" or "0" indicating that mobile communication device 101 is reachable, "1", or not reachable "0"). A twelfth row can comprise an SSID of a WiFi networks available to mobile communication device 101 a thirteenth row can indicate WiFi connectivity status ("Connected") and a fourteenth row can comprise a signal strength of the WiFi network (e.g. "10 dB"), if connected.

In some embodiments, state data 102 further comprises a non-routable, non-identifiable device ID. For example, in some embodiments, information associated with users cannot be shared beyond a carrier and/or a provider of mobile electronic device 101 for privacy and/or regulatory reasons. However, there can be a further need to identify users via an anonymous (for privacy reasons) and non-routable (for security reasons) ID, e.g. the non-routable, non-identifiable device ID. For example, a personal identification number (PIN), such as 9e45a566 comprises routable/identifiable information that can be a) traced back to a user and b) used to hack into mobile electronic device 101 and/or an associated network. To prevent this, on the content provider side, the PIN can be converted into a hashed identifier, such that even if that the hash was accessed by a party that shouldn't be able to access it, no harm can be done.

In some embodiments, state data 102 can comprise at least a subset of wireless network data 104. For example, state data 102 and network data 104 can each comprise a home carrier network identifier, roaming status, a roaming carrier network identifier, carrier network connectivity status and/or coverage data.

In any event, processing unit 222 is enabled to generate state data 102 on a periodic basis and/or when a given state of mobile communication device 101 changes (e.g. when a connectivity status changes, when mobile communication device 101 is turned on/off, and/or the like) and/or when a given state of mobile communication device 101 reaches a threshold value (e.g. available memory drops below a threshold, battery power falls or rises above a given threshold value and/or by a given percentage, a signal strength falls above or below a given threshold value, and/or the like) and/or just prior to transmitting wireless network data 104. Indeed, processing unit 222 is further enabled to generate and transmit wireless network data 104 to DC server 103, and to cause transmission of state data 102 to DC server 103 by incorporating state data 102 into wireless network data 104. In embodiments where state data 102 comprises a subset of wireless network data 104, only additional state data is incorporated into wireless network data 104: e.g. if wireless network data 104 already comprises a roaming status and an identifier of the roaming carrier network, then redundant data comprising roaming status and an identifier of the roaming carrier network is not added to wireless network data 104 to reduce the overall size of the transmission to DC server 103.

Figure 3:
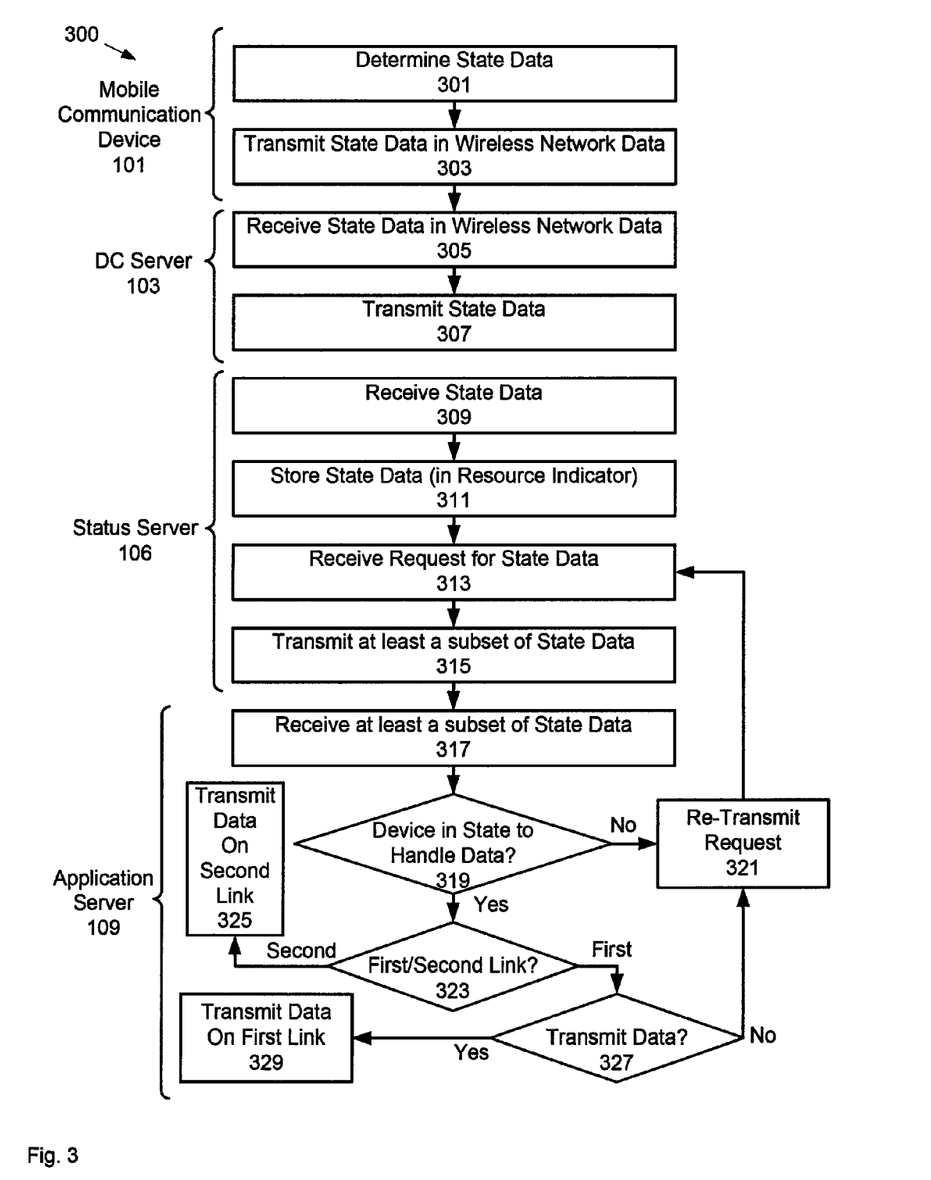

Attention is now directed to FIG. 3 which depicts a method 300 for propagating the state of a wireless communication device. In order to assist in the explanation of method 300, it will be assumed that method 300 is performed using system 100. Furthermore, the following discussion of method 300 will lead to a further understanding of system 100 and its various components. However, it is to be understood that system 100 and/or method 300 can be varied, and need not work exactly as discussed herein in conjunction with each other, and that such variations are within the scope of present embodiments.

At step 301, mobile communication device 101 determines state data 102, as described above with reference to Table 1. Step 301 can be performed periodically (e.g. every few minutes, every few hours, etc., as desired), when a given state changes, when a given state reaches a predefined threshold, and/or prior to transmission of wireless network data 104. In some embodiments, state data 102 is stored in memory device 225. In some embodiments, if state data 102 has been previously stored in memory device 225, then when state data 102 is again determined, stored state data 102 is updated rather than being overwritten in memory device 225 (e.g. if power of battery 230 changes, but no other given state has changed, then the field of Table 1 comprising battery power is updated, rather than each field of Table 1 being repopulated and/or Table 1 being overwritten).

At step 303, mobile communication device 101 transmits state data 102 to DC server 103 via link 105, by incorporating state data 102 into wireless network data 104 and transmitting wireless network data 104 to DC server 103. For example, state data 102 is appended to wireless network data 104; however state data 102 can be incorporated into wireless network data 104 in any suitable manner. In some embodiments data redundancy is eliminated, as described above. Furthermore, by incorporating state data 102 into wireless network data 104, which is to be transmitted to DC server 103 irrespective of state data 102 being incorporated into wireless network data 104, mobile communication device 101 is prevented from performing a special transmission of state data 102. Indeed, it is understood that in some embodiments, wireless network data 104 can be transmitted to DC server 103 without state data 102 being incorporated therein, for example when a hand-off between cell towers (such as carrier network tower 204) is to occur and no change in the state of mobile communication device 101 has occurred since the last transmission of state data 102 in wireless network data 104. Hence, in some embodiments, mobile communication device 101 can comprise logic to determine whether state data 102 is to be incorporated into wireless network data 104, and such a decision can be based on whether or not a change has occurred to state data 102, whether state data 102 has reached a predefined threshold, etc. Indeed, a plurality of triggers can exist for incorporating state data 102 into wireless network data 104. However, it is understood that whatever change has occurred to state data 102 can affect the transmission of data 113 from application server 109 to mobile communication device 101.

It is furthermore understood that in some embodiments, state data 102 can be generated, but mobile communication device 101 does not transmit state data 102 until wireless network data 104 is transmitted. In other words, state data 102 is generally transmitted when wireless network data 104 is transmitted (and when state data 102 has been generated and/or updated), and state data 102 is not transmitted when wireless network data 104 is not transmitted.

In embodiments where mobile application server 101 is being turned off, or is going offline, prior to turning off or going off line, wireless network data 104 is transmitted to DC server 103 during the turning off process or going off line process to notify DC server 103 that mobile communication device 101 is no longer available to receive calls and/or data. In these embodiments, state data 102 can indicate that mobile communication device 101 is "Off" or that there is no coverage ("0") of mobile communication device 101 or that mobile communication device 101 is "Not Connected".

At step 305, DC server 103 receives state data 102 in wireless network data 104 and extracts state data 102 from wireless network data 104. Wireless network data 104 is then processed accordingly for carrier network management purposes and at step 307 state data 102 is transmitted to status server 106 via link 108.

At step 309, state data 102 is received at status server 106 and at step 311 state data is stored at memory device 125. In some embodiments, state data 102 can be stored in resource indicator 107.

At step 313, request 111 for state data 102 is received from application server 109. For example, application server 109 can be preparing to transmit data 112 and requests state data 102 from status server 106 by transmitting request 111 to status server 106 via link 110.

At step 315, status server 106 responds to request 111 by transmitting at least a subset of state data 102 to application server 109, such that application server 109 can determine whether mobile communication device 101 is in a condition to handle data 112. In some embodiments, at step 315, status server 106 strips (e.g. removes) the at least a subset of the state data 102 of data identifying a user associated with mobile communications device 101 such that the at least a subset is provided anonymously. For example, in some embodiments, state data 102 can further comprise an identifier of a user of mobile communication device 101, such a name, address, carrier network customer information, and the like, e.g. in additional rows of Table 1. Hence, to provide state data 102 anonymously, status server 106 strips such data from state data 102. In these embodiments, status server 106 can store format data identifying which section of state data 102 contain user data such that those sections can be deleted.

In yet further embodiments, request 111 can comprise a request for specific state data, for example, whether or not mobile communication device 101 is roaming. In these embodiments, only a subset of state data 102 which is pertinent to request 111 is transmitted to application server 109.

In some embodiments, steps 313 and 315 occur via API 131 at server 106.

At step 317, at least a subset of state data 102 is received at application server 109.

At step 319, application server 109 processes at least a subset of state data 102 to determine whether mobile communication device 101 is in a condition to handle data 112. In some embodiments, application server 109 can determine whether mobile communication device 101 can receive data 112. In other embodiments, application server 109 can determine whether mobile communication device 101 can process data 112. For example, application server 109 can determine whether mobile communication device 101 is on or off, connected, whether there is sufficient coverage, whether there is enough remaining battery power to receive and/or process data 112, whether there is enough memory available at memory device 225 to receive and/or process data 112, and the like. For example, in some embodiments, data 112 can be data for a battery heavy feature at mobile communication device 101 (e.g. data 112 can require a lot of battery heavy processing at mobile communication device 101). Hence, when battery power is below a certain threshold, it is not prudent to transmit data 112 to mobile communication device 101 as processing of data 112 at mobile communication device 101 could cause the remaining power to be depleted.

When it is determined that mobile communication device 101 is not in a state to handle data 112, in some embodiments, method 300 ends (not depicted). In other embodiments, request 111 is retransmitted to status server 109, as described above, in order to request updated state data 102, preventing data 112 from being transmitted to mobile communication device 101 or delaying transmission until mobile communication device 101 is in a state to handle data 112.

When mobile communication device 101 is in a state to handle data 112, at step 323, application server 109 determines whether data 112 can be transmitted to mobile communication device 101 via (second) link 114 rather than (first) link 113. Transmission of data on link 114 can be cheaper than transmission of data on link 113: e.g. link 114 can comprise a WiFi link while link 113 can comprise a carrier network link; it is appreciated that a billing rate for the first link 113 is greater than a billing rate for the second link 114. In these embodiments, application server 109 can be enabled to transmit data 112 via link 114, at step 325, when link 114 is available, hence reducing cost for transmission of data 112.

Otherwise at an optional step 327 it is determined whether to transmit data 112 on link 113. For example, application server 109 can be enabled not to transmit data 112 when link 114 comprises a roaming carrier network link, i.e. when mobile communication device 101 is roaming, to reduce cost in transmitting data 112. If data 112 is not to be transmitted, then request 111 can be retransmitted at step 321, as described above, such that it can again be determined when link 114 is available and/or link 113 comprises a home carrier network link. In any event, when it is determined at step 327 that data 112 is to be transmitted via link 113, data 112 is transmitted at step 329.

In some embodiments, step 327 can further comprise determining whether data 112 can be transmitted on link 113 without first communicating with mobile communication device 101. For example, in some of these embodiments, prior to transmitting data 112, application server 109 can first query mobile communication device 101 to determine whether data 112 is to be transmitted. Such a query can be prevented by processing at least a subset of state data 102. However, if at step 327 it is determined that data is not to be transmitted based on processing at least a subset of state data 102, then in some embodiments, the query to mobile communication device 101 can be transmitted. For example, if application server 109 is enabled not to transmit data 112 when mobile communication device 101 is roaming, mobile communication device 101 can then be queried as to whether data 112 is to be nonetheless sent. Such a query can trigger mobile communication device 101 to produce an alert that application server 109 is requesting that data 112 be transmitted such that input data can be received at input device 226 indicating whether or not data 112 is to be transmitted; a response to the query can then be transmitted back to application server 109. For example, when mobile device 101 is roaming, this enables push data to be received or not received based on preferences received at mobile communication device 101. Alternatively, such preferences can be stored at mobile communication device 101 prior to receiving such a query, enabling mobile communication device 101 to respond automatically to the query.

In some embodiments, once application server 109 receives at least a subset of state data 102, application server 109 can process state data 102 to determine a time that state data 102 was generated (e.g. the time stored in Table 1). In some of these embodiments, when a difference in time between a current time and the time in state data 102 is above a threshold value, application server 109 can determine that state data 102 may no longer be a current state of mobile electronic device 101 and transmit a query to mobile communication device 101 via link 113 (or link 114) to determine if mobile communication device 101 is in a state to handle data 112. For example, if state data 102 is several hours or several days old, there may be a likelihood that the state of mobile communication device 101 has changed. In some of these embodiments, mobile communication device 101 can have been prevented from generating and/or transmitting state data 102 due to a change in settings at mobile communication device 101 and/or connectivity problems.

In any event, by transmitting state data 102 to status server 106 via wireless network data 104, the state of mobile communication device 101 is propagated through system 100 without using dedicated transmissions, thus reducing battery usage at mobile communication device 101 and reducing bandwidth used to propagate the state. Furthermore, by making state data 102 available to application server 109 at status server 106, application usage of network resources and resources at mobile communication device 101 is reduced and/or optimized. For example, WiFi links can be used instead of more expensive 3G links. Applications that require heavy battery usage at mobile communication device 101 can be prevented from transmitting data 112 to mobile communication device 101 if the available power is below a predefined threshold.

In some embodiments, the functionality of mobile communication device 101, DC server 103, status server 106 and application server 109 can be implemented using pre-programmed hardware or firmware elements (e.g., application specific integrated circuits (ASICs), electrically erasable programmable read-only memories (EEPROMs), etc.), or other related components. In other embodiments, the functionality of mobile communication device 101, DC server 103, status server 106 and application server 109 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method of propagating a mobile communication device state, said method comprising:
   receiving, from a mobile communication device, at a server in communication with said mobile communication device, state data defining a state of said mobile communication device, said state data incorporated into wireless network data transmitted from said mobile communication device;
   storing, at said server, said state data in a resource indicator;
   receiving a request for said state data from a second server; and
   transmitting at least a subset of said state data to said second server, such that said second server can determine whether said mobile communication device is in a state to handle incoming data, said incoming data normally transmitted to said mobile communication device via a first link, and said state data comprises data for determining whether said incoming data can be transmitted to said mobile communication device via a second link different from said first link,
   wherein when a difference between a current time, and a time that said state data was generated, said time stored in said state data, is above a threshold value, said second server determines that state data received from said server no longer comprises a current state of said mobile electronic device, and said mobile communication device receives a query from said second server on one of said first link and said second link to determine if mobile communication device is in said state to handle said incoming data.

2. The method of claim 1, wherein transmission of data on said first link is associated with a first billing rate that is greater than a second billing rate associated with transmission of data on said second link.

3. The method of claim 1, wherein said first link comprises a wireless link.

4. The method of claim 1, wherein said receiving said request step and said transmitting step each occur via a server-to-server API (application programming interface) at said server.

5. The method of claim 1, wherein said state data comprises at least one of current power remaining on a battery at said mobile communication device, available memory at said mobile communication device, a roaming status, a coverage status, a signal strength for a wireless link between said mobile communication device and a network, a connectivity status between said mobile communication device and a network, or an on-off status.

6. The method of claim 1, wherein said server comprises a proxy server for storing state information of a plurality of mobile communication devices.

7. The method of claim 1, wherein communication between said server and said mobile communication device occurs via a data center.

8. The method of claim 1, further comprising removing said at least a subset of said state data of data identifying a user associated with said mobile communications device such that said at least a subset is provided anonymously.

9. A server configured to propagate a mobile communication device state, said server comprising:
   a processing unit interconnected with a memory device and a communication interface, said processing unit enabled to:
   receive, from a mobile communication device, via said communication interface, state data defining a state of said mobile communication device, said state data incorporated into wireless network data transmitted from said mobile communication device;
   store, at said memory device, said state data in a resource indicator;
   receive, via said communication interface, a request for said state data from a second server; and
   transmit, via said communication interface, at least a subset of said state data to said second server, such that said second server can determine whether said mobile communication device is in a state to handle incoming data, said incoming data normally transmitted to said mobile communication device via a first link, and said state data comprises data for determining whether said incoming data can be transmitted to said mobile communication device via a second link different from said first link
   wherein when a difference between a current time, and a time that said state data was generated, said time stored in said state data, is above a threshold value, said second server determines that said state data received from said server no longer comprises a current state of said mobile electronic device, and said mobile communication device receives a query from said second server on one of said first link and said second link to determine if mobile communication device is in said state to handle said incoming data.

10. The server of claim 9, wherein transmission of data on said first link is associated with a first billing rate that is greater than a second billing rate associated with transmission of data on said second link.

11. The server of claim 9, wherein said first link comprises a wireless link.

12. The server of claim 9, wherein said receive said request step and said transmit step each occurs via a server-to-server API (application programming interface) at said server.

13. The server of claim 9, wherein said state data comprises at least one of current power remaining on a battery at said mobile communication device, available memory at said mobile communication device, a roaming status, a coverage status, a signal strength for a wireless link between said mobile communication device and a network, a connectivity status between said mobile communication device and a network, or an on-off status.

14. The server of claim 9, further comprising a proxy server for storing state information of a plurality of mobile communication devices.

15. The server of claim 9, wherein communication between said server and said mobile communication device occurs via a data center.

16. The server of claim 9, wherein said processing unit is further enabled to remove said at least a subset of said state data of data identifying a user associated with said mobile communications device such that said at least a subset is provided anonymously.

17. A system for propagating a mobile communication device state, said system comprising:
　a mobile communication device enabled to transmit state data defining a state of said mobile communication device, said state data incorporated into wireless network data transmitted from said mobile communication device;
　a data center server in communication with said mobile communication device, said data center server enabled to extract said state data from said wireless network data and transmit said state data;
　a status server in communication with said data center server, said status server enabled to:
　　receive said state data from said data center server;
　　store said state data in a resource indicator;
　　receive a request for said state data; and
　　transmit at least a subset of said state data; and
　an application server in communication with said status server, said application server enabled to:
　　request said state data from said status server;
　　receive at least a subset of said state data;
　　determine whether said mobile communication device is in a state to handle incoming data, said incoming data normally transmitted to said mobile communication device via a first link, and said state data comprises data for determining whether said incoming data can be transmitted to said mobile communication device via a second link different from said first link;
　　when a difference between a current time, and a time received from said server in said state data, is above a threshold value, determine that said state data received from said server no longer comprises a current state of said mobile electronic device; and,
　　transmit a query to said mobile electronic device on one of said first link and said second link to determine if mobile communication device is in said state to handle said incoming data.

18. A computer program product, comprising a non-transitory computer usable medium having a computer readable program code adapted to be executed to implement a method for propagating a mobile communication device state, said method comprising:
　receiving, from a mobile communication device at a server in communication with said mobile communication device, state data defining a state of said mobile communication device, said state data incorporated into wireless network data transmitted from said mobile communication device;
　storing, at said server, said state data in a resource indicator;
　receiving a request for said state data from a second server; and
　transmitting at least a subset of said state data to said second server, such that said second server can determine whether said mobile communication device is in a state to handle incoming data, said incoming data normally transmitted to said mobile communication device via a first link, and said state data comprises data for determining whether said incoming data can be transmitted to said mobile communication device via a second link different from said first link,
　wherein when a difference between a current time, and a time that said state data was generated, said time stored in said state data, is above a threshold value, said second server determines that said state data received from said server no longer comprises a current state of said mobile electronic device, and said mobile communication device receives a query from said second server on one of said first link and said second link to determine if mobile communication device is in said state to handle said incoming data.

* * * * *